No. 635,348. Patented Oct. 24, 1899.
J. M. POPE.
COTTON CHOPPER AND SIDER.
(Application filed Mar. 1, 1899.)
(No Model.)
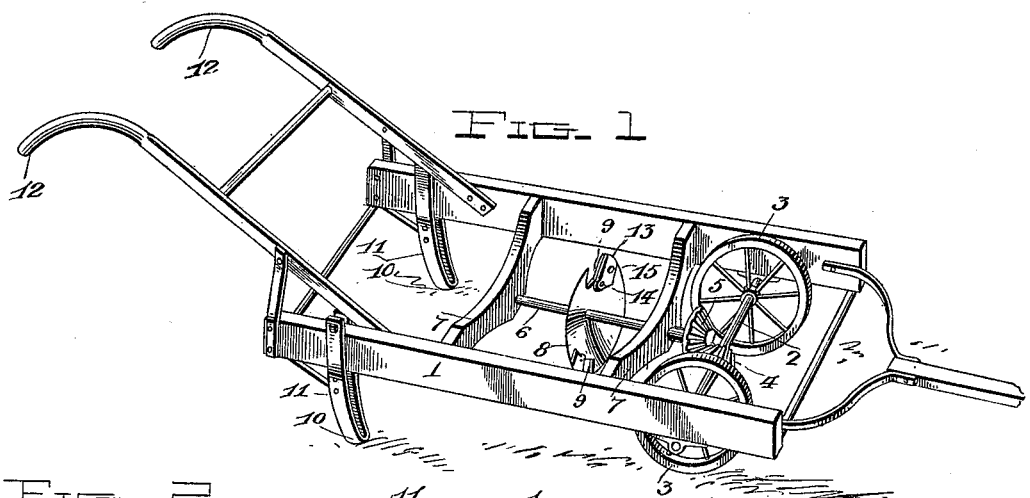
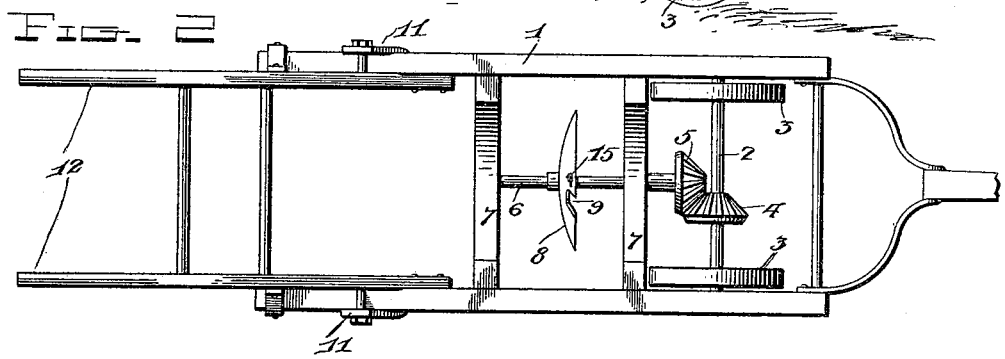
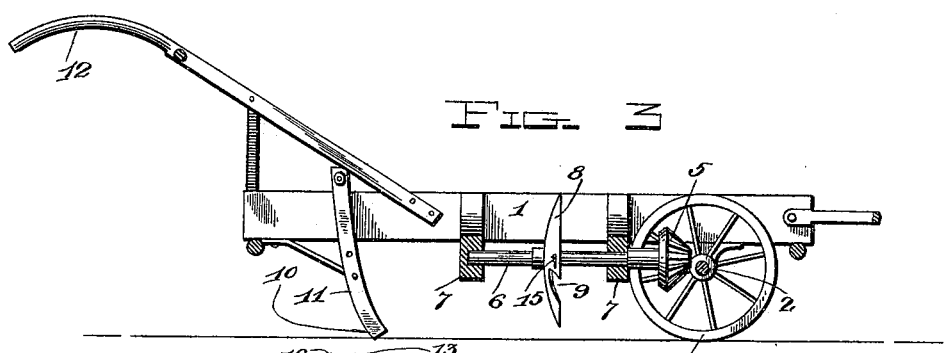
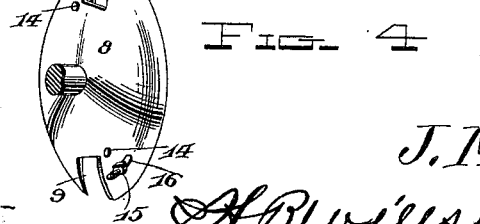
Inventor
J. M. Pope,
by
H. B. Willson & Co.
Attorneys
Witnesses

UNITED STATES PATENT OFFICE.

JOHN M. POPE, OF JACOBS, GEORGIA.

COTTON CHOPPER AND SIDER.

SPECIFICATION forming part of Letters Patent No. 635,348, dated October 24, 1899.

Application filed March 1, 1899. Serial No. 707,369. (No model.)

*To all whom it may concern:*

Be it known that I, JOHN M. POPE, a citizen of the United States, residing at Jacobs, in the county of Berrien and State of Georgia, have invented certain new and useful Improvements in a Combined Cotton Chopper and Sider; and I do declare the following to be a full, clear, and exact description of the invention, such as will enable others skilled in the art to which it appertains to make and use the same.

My invention relates to improvements in cotton-cultivators, and more particularly to that class employed in chopping out the weeds and thinning the cotton and siding up the rows; and the object is to provide a simple, inexpensive, and practical implement of this character.

To this end the invention consists in certain features of construction and combination of parts, which will be hereinafter fully described, and particularly pointed out in the appended claim.

In the drawings, Figure 1 is a perspective view of my improved cotton chopper and sider combined. Fig. 2 is a top plan view of the same. Fig. 3 is a longitudinal central section. Fig. 4 is a detail perspective view of the disk chopper.

In the drawings, 1 denotes the rectangular frame, provided with the usual tongue, to which a pair of horses is hitched.

2 denotes an axle journaled in the front portion of the machine and provided with carrying or ground wheels 3 3 and a bevel-gear 4, which meshes with a bevel-gear 5, fixed on the forward end of the longitudinal shaft 6, journaled in the cross-braces 7 7.

8 denotes a concave disk-shaped chopping-blade provided with a circumferential knife-edge and two oppositely-disposed radial recesses 9 9.

11 11 denote the standards adjustably secured to the frame and supported by the diagonal braces 10 10, and 12 12 denote the usual handles suitably secured to the rear end of the machine.

13 denotes a blade or plate pivoted on a screw-bolt 14, fixed in the solid portion of the disk on one side of each of the recesses 9 9, and 15 denotes a thumb-screw in said plate and extending through a slot 16 in the chopping-blade, by means of which the plate may be so adjusted as to increase or diminish the width of the gap or recess 9.

The operation is as follows: The horses travel on opposite sides of the row to be chopped out and the disk-shaped chopping-blade rotates as it is drawn along, thus scraping and chopping at the same time, the solid portion of the disk chopping and scraping out the superfluous plants, while the notched or recessed portions permit certain plants to remain untouched at predetermined intervals, the distance between the standing plants being regulated by extra bevel-gears in place of bevel-gear 4, which is larger, and by moving the journals forward connect them, and for long distances between plants close up one recess 9, or closer with both recesses open. This gear is movable on the axle and can be moved out of the way of the axle when regular gear is used, both having set-screws. The shovel-plows 10 10 follow after the rotating disk and side up the plants that are left standing.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

In a cotton-chopper, the combination with the concave chopping-disk formed with the radial recesses, and the auxiliary plates pivoted to said disk, and adapted to increase or diminish the width of said recesses and means for rotating said disk at a right angle to the line of draft, substantially as and for the purpose set forth.

In testimony whereof I have hereunto set my hand in presence of two subscribing witnesses.

JOHN M. POPE.

Witnesses:
J. E. JONES,
G. L. BLALOCK.